United States Patent
Forney et al.

(10) Patent No.: US 11,609,579 B2
(45) Date of Patent: Mar. 21, 2023

(54) SYSTEMS AND METHODS FOR USING RISK PROFILES BASED ON PREVIOUSLY DETECTED VEHICLE EVENTS TO QUANTIFY PERFORMANCE OF VEHICLE OPERATORS

(71) Applicant: SmartDrive Systems, Inc., Westlake, TX (US)

(72) Inventors: David Forney, La Jolla, CA (US); Nicholas Shayne Brookins, Encinitas, CA (US); Reza Ghanbari, San Diego, CA (US); Jason Palmer, Carlsbad, CA (US); Mark Freitas, San Diego, CA (US)

(73) Assignee: SmartDrive Systems, Inc., Westlake, TX (US)

( * ) Notice: Subject to any disclaimer, the term of this patent is extended or adjusted under 35 U.S.C. 154(b) by 120 days.

(21) Appl. No.: 16/400,874

(22) Filed: May 1, 2019

(65) Prior Publication Data
US 2020/0348693 A1 Nov. 5, 2020

(51) Int. Cl.
*G05D 1/02* (2020.01)
*G07C 5/08* (2006.01)
*G05D 1/00* (2006.01)

(52) U.S. Cl.
CPC ......... *G05D 1/0291* (2013.01); *G05D 1/0055* (2013.01); *G05D 1/0088* (2013.01); *G07C 5/085* (2013.01); *G05D 2201/0213* (2013.01)

(58) Field of Classification Search
CPC .. G05D 1/0291; G05D 1/0055; G05D 1/0088; G05D 2201/0213; G07C 5/085
See application file for complete search history.

(56) References Cited

U.S. PATENT DOCUMENTS

| | | |
|---|---|---|
| 7,219,067 B1 | 5/2007 | McMullen |
| 7,590,616 B2 | 9/2009 | Guan |
| 7,930,232 B2 | 4/2011 | Cooper |
| 8,326,746 B1 | 12/2012 | Crawford |
| 8,915,738 B2 | 12/2014 | Mannino |
| 8,989,959 B2 | 3/2015 | Plante |

(Continued)

OTHER PUBLICATIONS

PCT International Search Report and Written Opinion for PCT Application No. PCT/US2020/027035, dated Jun. 19, 2020 (14 pages).

*Primary Examiner* — Ramsey Refai
(74) *Attorney, Agent, or Firm* — Esplin & Associates, PC

(57) ABSTRACT

Systems and methods for using risk profiles for fleet management of a fleet of vehicles are disclosed. Fleet management may include determining the performance levels of particular vehicle operators. The risk profiles characterize values representing likelihoods of occurrences of vehicle events. The values are based on vehicle event information for previously detected vehicle events. Exemplary implementations may: receive, from a particular vehicle, particular vehicle event information for particular vehicle events that have been detected by the particular vehicle; determine one or more metrics that quantify a performance level of the particular vehicle operator, based on the risk profiles; compare the one or more metrics for the particular vehicle operator with aggregated metrics that quantify performance levels of a set of vehicle operators; and store, transfer, and/or present results of the comparison.

17 Claims, 3 Drawing Sheets

(56) References Cited

U.S. PATENT DOCUMENTS

| | | | |
|---|---|---|---|
| 9,226,004 | B1 | 12/2015 | Plante |
| 9,298,809 | B2 | 3/2016 | Kemp |
| 9,625,266 | B1 | 4/2017 | Chintakindi |
| 9,852,475 | B1 * | 12/2017 | Konrardy ............ G06Q 10/0635 |
| 9,898,759 | B2 | 2/2018 | Khoury |
| 10,083,493 | B1 * | 9/2018 | Davis .................... H04L 67/145 |
| 10,129,221 | B1 | 11/2018 | McClendon |
| 10,203,212 | B2 | 2/2019 | Mazzella |
| 10,204,528 | B2 | 2/2019 | Truong |
| 10,371,542 | B2 | 8/2019 | O'Herlihy |
| 10,402,771 | B1 | 9/2019 | De |
| 10,445,950 | B1 | 10/2019 | De |
| 10,591,311 | B2 | 3/2020 | Augst |
| 10,664,922 | B1 | 5/2020 | Madigan |
| 10,672,198 | B2 | 6/2020 | Brinig |
| 10,679,497 | B1 | 6/2020 | Konrardy |
| 10,789,838 | B2 | 9/2020 | Amacker |
| 11,124,186 | B1 | 9/2021 | Konrardy |
| 11,175,660 | B1 | 11/2021 | Fields |
| 2002/0111172 | A1 | 8/2002 | Dewolf |
| 2003/0154009 | A1 | 8/2003 | Basir |
| 2004/0236596 | A1 * | 11/2004 | Chowdhary ............. G08G 1/20 705/26.1 |
| 2005/0097028 | A1 | 5/2005 | Watanabe |
| 2007/0001831 | A1 | 1/2007 | Raz |
| 2008/0004638 | A1 | 1/2008 | Baker |
| 2009/0234552 | A1 | 9/2009 | Takeda |
| 2010/0063850 | A1 | 3/2010 | Daniel |
| 2010/0157061 | A1 | 6/2010 | Katsman |
| 2011/0173015 | A1 | 7/2011 | Chapman |
| 2011/0178702 | A1 | 7/2011 | Lassesson |
| 2012/0174111 | A1 | 7/2012 | Pala |
| 2012/0191343 | A1 | 7/2012 | Haleem |
| 2013/0198031 | A1 | 8/2013 | Mitchell |
| 2014/0073362 | A1 | 3/2014 | Kawata |
| 2014/0180730 | A1 | 6/2014 | Cordova |
| 2014/0372226 | A1 | 12/2014 | Pavley |
| 2015/0064659 | A1 * | 3/2015 | Dubens .................... G09B 5/00 434/65 |
| 2015/0223024 | A1 | 8/2015 | Abuodeh |
| 2015/0266455 | A1 | 9/2015 | Wilson |
| 2015/0278855 | A1 | 10/2015 | Khoury |
| 2016/0117872 | A1 | 4/2016 | Plante |
| 2017/0010109 | A1 | 1/2017 | Hayon |
| 2017/0032324 | A1 | 2/2017 | Grover |
| 2017/0123421 | A1 | 5/2017 | Kentley |
| 2017/0132117 | A1 | 5/2017 | Stefan |
| 2017/0221149 | A1 | 8/2017 | Hsu-Hoffman |
| 2017/0255966 | A1 * | 9/2017 | Khoury .................... H04L 67/20 |
| 2017/0323244 | A1 * | 11/2017 | Rani ............... G06Q 10/06393 |
| 2018/0086347 | A1 | 3/2018 | Shaikh |
| 2018/0089605 | A1 | 3/2018 | Poornachandran |
| 2018/0130095 | A1 | 5/2018 | Khoury |
| 2018/0157979 | A1 | 6/2018 | Dehaghani |
| 2018/0253769 | A1 | 9/2018 | Ye |
| 2018/0339712 | A1 * | 11/2018 | Kislovskiy ......... B60W 50/0205 |
| 2018/0340790 | A1 * | 11/2018 | Kislovskiy ......... G01C 21/3484 |
| 2018/0341888 | A1 * | 11/2018 | Kislovskiy ....... G08G 1/096838 |
| 2018/0350144 | A1 | 12/2018 | Rathod |
| 2018/0356814 | A1 | 12/2018 | Brooks |
| 2019/0005812 | A1 | 1/2019 | Matus |
| 2019/0022347 | A1 | 1/2019 | Wan |
| 2019/0102840 | A1 | 4/2019 | Perl |
| 2019/0212453 | A1 | 7/2019 | Natroshvili |
| 2020/0101969 | A1 | 4/2020 | Natroshvili |
| 2020/0241564 | A1 | 7/2020 | Goldman |
| 2020/0348675 | A1 | 11/2020 | Brookins |
| 2020/0348692 | A1 | 11/2020 | Ghanbari |
| 2020/0357175 | A1 | 11/2020 | Silverstein |
| 2021/0049714 | A1 | 2/2021 | Shaaban |
| 2021/0089780 | A1 | 3/2021 | Chang |
| 2021/0312525 | A1 | 10/2021 | Goenka |
| 2021/0331668 | A1 | 10/2021 | Udipi |

* cited by examiner

US 11,609,579 B2

SYSTEMS AND METHODS FOR USING RISK PROFILES BASED ON PREVIOUSLY DETECTED VEHICLE EVENTS TO QUANTIFY PERFORMANCE OF VEHICLE OPERATORS

FIELD OF THE DISCLOSURE

The present disclosure relates to systems and methods for using risk profiles for fleet management of a fleet of vehicles. The risk profiles characterize values representing likelihoods of occurrences of vehicle events. The values are based on vehicle event information for previously detected vehicle events. Fleet management may include determining the performance levels of vehicle operators.

BACKGROUND

Systems configured to record, store, and transmit video, audio, and sensor data associated with a vehicle, e.g. to monitor the speed of a vehicle, are known. Such systems may detect vehicle events such as speeding and transmit relevant event information to a stakeholder. Systems for monitoring and managing a fleet of vehicles are known.

SUMMARY

One aspect of the present disclosure relates to a system configured for using risk profiles for fleet management of a fleet of vehicles, wherein the risk profiles characterize values representing likelihoods of occurrences of vehicle events, wherein the values are based on vehicle event information for previously detected vehicle events. The system may include one or more hardware processors configured by machine-readable instructions. The processor(s) may be configured to obtain a first risk profile, a second risk profile, vehicle event characterization information, and/or other information. The first risk profile may be specific to a certain context for detecting vehicle events. The first risk profile may characterize a first set of values representing likelihoods of occurrences of vehicle events matching the certain context. The second risk profile may be specific to operators. The second risk profile may characterize a second set of values representing likelihoods of occurrences of vehicle events matching the operators. The vehicle event characterization information may characterize one or more types of vehicle events to be used in determining performance levels by particular vehicle operators. The processor(s) may be configured to receive, from a particular vehicle, particular vehicle event information for particular vehicle events that have been detected by the particular vehicle. The particular vehicle may have a particular vehicle type and is operated by a particular vehicle operator. The particular vehicle event information may include particular locations of the particular vehicle events. The particular vehicle event information may further include particular types of the particular vehicle events. The processor(s) may be configured to determine one or more metrics that quantify a performance level of the particular vehicle operator. The determination of the one or more metrics may be based on one or more of the received particular vehicle event information, the first risk profile, the vehicle event characterization information, and/or other information. The processor(s) may be configured to compare the one or more metrics for the particular vehicle operator with aggregated metrics that quantify performance levels of a set of vehicle operators. The processor(s) may be configured to store, transferring, and/or presenting results of the comparison.

Another aspect of the present disclosure relates to a method for using risk profiles for fleet management of a fleet of vehicles, wherein the risk profiles characterize values representing likelihoods of occurrences of vehicle events, wherein the values are based on vehicle event information for previously detected vehicle events. The method may include obtaining a first risk profile, a second risk profile, vehicle event characterization information, and/or other information. The first risk profile may be specific to a certain context for detecting vehicle events. The first risk profile may characterize a first set of values representing likelihoods of occurrences of vehicle events matching the certain context. The second risk profile may be specific to operators. The second risk profile may characterize a second set of values representing likelihoods of occurrences of vehicle events matching the operators. The vehicle event characterization information may characterize one or more types of vehicle events to be used in determining performance levels by particular vehicle operators. The method may include receiving, from a particular vehicle, particular vehicle event information for particular vehicle events that have been detected by the particular vehicle. The particular vehicle may have a particular vehicle type and is operated by a particular vehicle operator. The particular vehicle event information may include particular locations of the particular vehicle events. The particular vehicle event information may further include particular types of the particular vehicle events. The method may include determining one or more metrics that quantify a performance level of the particular vehicle operator. The determination of the one or more metrics may be based on one or more of the received particular vehicle event information, the first risk profile, the vehicle event characterization information, and/or other information. The method may include comparing the one or more metrics for the particular vehicle operator with aggregated metrics that quantify performance levels of a set of vehicle operators. The method may include storing, transferring, and/or presenting results of the comparison.

As used herein, any association (or relation, or reflection, or indication, or correspondency) involving servers, processors, client computing platforms, vehicles, vehicle events, risk profiles, likelihoods, locations, vehicle types, event types, metrics, performance levels, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
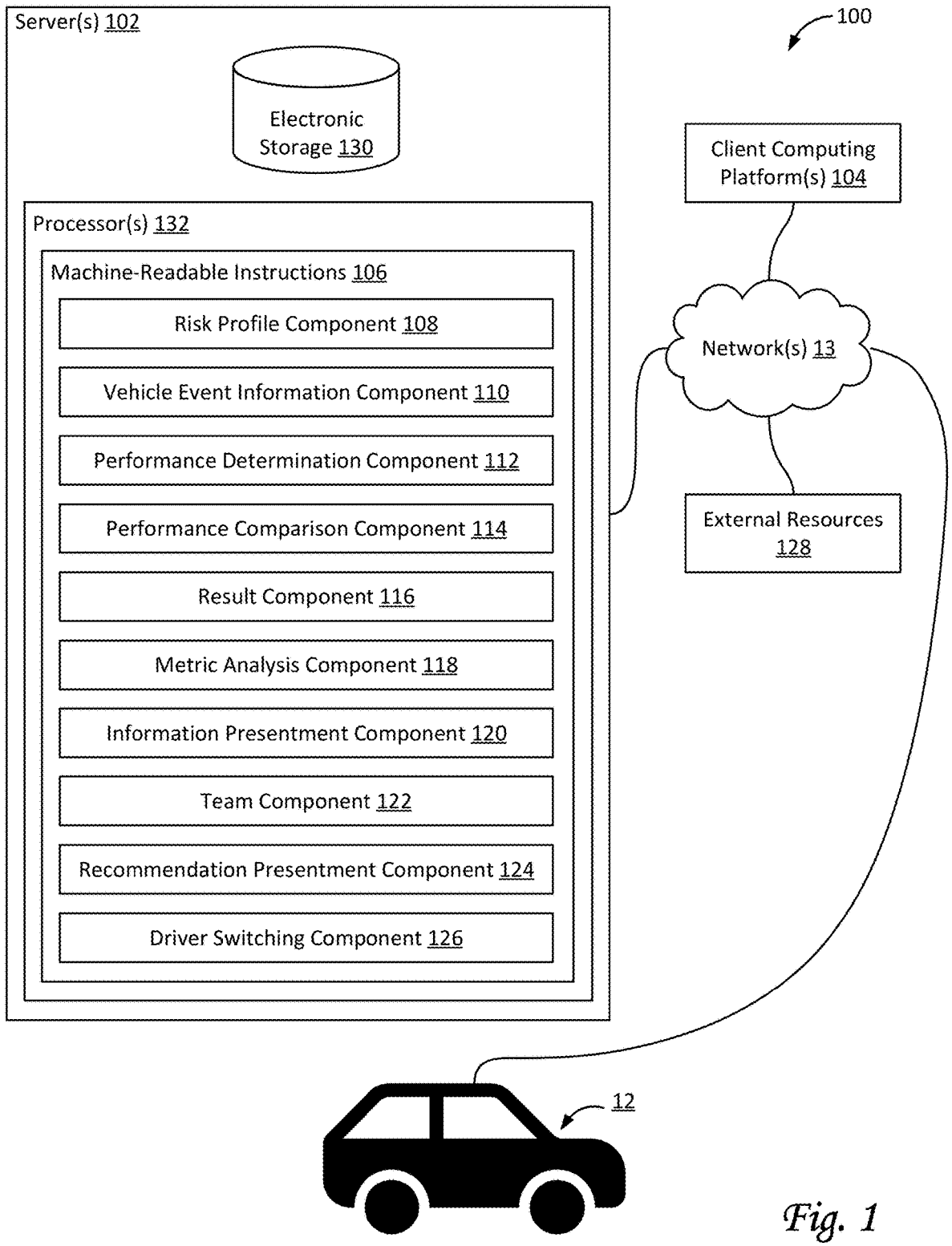
FIG. 1 shows a system configured for using risk profiles for fleet management of a fleet of vehicles, in accordance with one or more implementations.

FIG. 1 illustrates a system 100 configured for using risk profiles for fleet management of a fleet of vehicles, in accordance with one or more implementations. The fleet may include a vehicle 12 and/or other vehicles. In some implementations, system 100 may be configured to couple with vehicle 12 that is operated by a vehicle operator. As used here, the term fleet may refer to a set of at least 5 vehicles, at least 10 vehicles, at least 100 vehicles, at least 1000 vehicles, and/or another number of vehicles. For example, the fleet may include a first vehicle, a second vehicle, a third vehicle, a fourth vehicle, and so forth.

The risk profiles may characterize values representing likelihoods of certain occurrences. For example, a first risk profile may be specific to a certain context for detecting vehicle events. The first risk profile may characterize a first set of values representing likelihoods of occurrences of vehicle events matching the certain context. In some implementations, the first risk profile may be context-specific. For example, a second risk profile may be specific to operators. As used herein, an operator involved in a vehicle event may be a human vehicle operator, an autonomous driving algorithm, a type of vehicle, and/or a combination thereof. The second risk profile may characterize a second set of values representing likelihoods of occurrences of vehicle events matching the operators. In some implementations, the second risk profile may be operator-specific. In some implementations, additional and/or different risk profiles are envisioned within the scope of this disclosure. In some implementations, values characterized by risk profiles may be based on vehicle event information for previously detected vehicle events.

Individual vehicles may include a set of resources for data processing and/or electronic storage, including but not limited to persistent storage. Individual vehicles may include a set of sensors configured to generate output signals conveying information, e.g., related to the operation of the individual vehicles. Individual vehicles may be configured to detect vehicle events, e.g., based on output signals generated by sensors.

System 100 may include one or more of vehicle 12, server(s) 102, electronic storage 130, client computing platform(s) 104, external resource(s) 128, network(s) 13, and/or other components. In some implementations, system 100 may be a distributed data center, include a distributed data center, or act as a distributed data center. Alternatively, and/or simultaneously, system 100 may be a remote computing server, include a remote computing server, or act as a remote computing server, where a remote computing server is separate, discrete, and/or distinct from the fleet of vehicles. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a risk profile component 108, a vehicle event information component 110, a performance determination component 112, a performance comparison component 114, a result component 116, a metric analysis component 118, an information presentment component 120, a team component 122, a recommendation presentment component 124, a driver switching component 126, and/or other instruction components.

Risk profile component 108 may be configured to obtain and/or determine information, including but not limited to risk profiles. Risk profiles may include and/or represent likelihoods of occurrences of particular events, including but not limited to vehicle events. In some implementations, risk profiles may include and/or characterize values that represent likelihoods. In some implementations, the obtained and/or determined information may include a first risk profile, a second risk profile, vehicle event characterization information, and/or other information. In some implementations, the first risk profile may be specific to a certain context for detecting vehicle events. The first risk profile may characterize a first set of values representing likelihoods of occurrences of vehicle events matching the certain context. In some implementations, the second risk profile may be specific to operators. The second risk profile may characterize a second set of values representing likelihoods of occurrences of vehicle events matching and/or otherwise involving the operators. The vehicle event characterization information may characterize one or more types of vehicle events to be used in determining performance levels by vehicle operators. In some implementations, the first set of values, the second set of values, and/or other sets of values for risk profiles may be based on vehicle event information. In some implementations, the vehicle event information may be based on previously detected vehicle events. In some implementations, the vehicle event information may include information about previously detected vehicle events, including but not limited to certain context for the previously detected vehicle events and/or the operators for the previously detected vehicle events.

In some implementations, the certain context for detecting vehicle events may include one or more of (geographical) location, local weather, heading of one or more vehicles, traffic conditions, and/or other context information. For example, a location-based risk profile may include a set of locations in a particular geographical area where previously detected vehicles events occurred. In some implementations, a location-based risk profile may form the basis for a risk map of the particular geographical area. In some implementations, a risk profile may include traffic conditions (e.g., whether traffic was heavy or light, what kind of participants were part of the traffic, how close other vehicles were, etc.). In some implementations, a risk profile may combine different kinds of context information. For example, a location-based risk profile may also indicate likelihoods of occurrences of certain vehicle events during heavy traffic, light traffic, during rain or snow, heading east or west, and so forth.

In some implementations, the certain context for detecting vehicle events may include one or more of objects on roadways during detection of vehicle events, other incidents within a particular timeframe of detection of vehicle events, time of day, lane information, presence of autonomously operated vehicles within a particular proximity, and/or other (dynamic) context information, as well as combinations thereof.

The vehicle event characterization information may characterize one or more types of vehicle events to be used in determining performance levels by particular vehicle operators. For example, in some scenarios, a performance level of a particular vehicle operator may be determined based on occurrences of hard braking, because hard braking may be especially important to avoid for certain driving responsibilities. In other scenarios, hard braking may be relatively unimportant and/or common, for example for taxis in certain downtown areas. In such scenarios, the types of vehicle events that correspond to hard braking should not be paramount when determining a performance level. For example, in some scenarios, a performance level of a particular vehicle operator may be determined based on occurrences of U-turns, because U-turns may be especially important to avoid for certain driving responsibilities, including but not limited to 18-wheelers. In other scenarios, U-turns may be relatively unimportant and/or common, for example for taxis in certain downtown areas. In such scenarios, the types of vehicle events that correspond to U-turns should not be paramount when determining a performance level. In some implementations, vehicle event characterization information may characterize exceeding a speed threshold. In some implementations, vehicle event characterization information may characterize one or more of swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, parking a vehicle, and/or performing fuel-inefficient maneuvers. In some implementations, vehicle event characterization information may characterize collisions and near-collisions.

Vehicle event information component 110 may be configured to determine and/or receive, particular vehicle event information for particular vehicle events that have been detected by a particular vehicle. The particular vehicle event information may include information representing a route traversed by the particular vehicle. The particular vehicle may have a particular vehicle type. The particular vehicle may be operated by a particular vehicle operator. In some implementations, the particular vehicle operator may be an autonomous driving algorithm. In some implementations, the particular vehicle operator may be a team including a human vehicle operator and an autonomous driving algorithm. In some implementations, the particular vehicle event information may be context-specific, operator-specific, and/or otherwise specific. For example, the particular vehicle event information may include particular locations of particular vehicle events that have been detected along the route. In some implementations, the particular vehicle event information may include particular types of the detected particular vehicle events.

Performance determination component 112 may be configured to determine performance levels of vehicle operators. In some implementations, a performance level may be related to a specific and actual performance of a human vehicle operator while driving a vehicle along an actual route. Alternatively, and/or simultaneously, in some implementations, a performance level may be related to actual performance of a vehicle operator over a longer period of time, e.g., spanning weeks, months, years, the current employment with a particular fleet, and/or other periods. For example, performance determination component 112 may be configured to determine one or more metrics that quantify a performance level of a particular vehicle operator. In some implementations, determination of one or more metrics may be based on one or more of the particular vehicle event information (e.g., as received by vehicle event information component 110), the first risk profile, the vehicle event characterization information, and/or other information. For example, a metric to quantify a performance level may be a numerical value that is decreased for vehicle events that have been detected along a route, and increased for every particular number of miles driven without such occurrences. In some implementations, detected vehicle events may be filtered by one or more of certain contexts, particular vehicle type, vehicle event characterization information, and/or other specifics for vehicle events. Other mechanisms for increasing and/or decreasing (numerical) values are envisioned within the scope of this disclosure.

In some implementations, determining one or more metrics may include estimating (and/or comparing) expected occurrences of vehicle events during traversal of some route by the particular vehicle. For example, on average, a vehicle having the same type as the particular vehicle and traversing the same route as the particular vehicle could be expected to have 3 different vehicle events, by way of non-limiting example. Such expectations may be based on previously detected vehicle events for some fleet of vehicles, and/or based on the values in one or more risk profiles, and/or based on other information. If the particular vehicle operator had fewer than 3 vehicle events (or less severe or less important vehicle events), the particular vehicle operator would have a performance level that is better than average, in this example. Conversely, if the particular vehicle operator had more than 3 vehicle events (or more severe or more important vehicle events), the particular vehicle operator would have a performance level that is worse than average, in this example. In some implementations, averages may be determined for multiple vehicle operators in a particular company, in a particular geographical area, in a particular age or experience range, and/or based on any distinguishing characteristic(s) of a vehicle operator. Determining the one or more metrics may include comparing the particular vehicle event information for the particular vehicle events that have been detected by a particular vehicle during traversal of a particular route with the estimated expected occurrences of vehicles events. In some implementations, determinations and/or estimations by performance determination component 112 may be based on one or more of the first risk profile, the second risk profile, the vehicle event characterization information, and/or other information.

Figure 3:
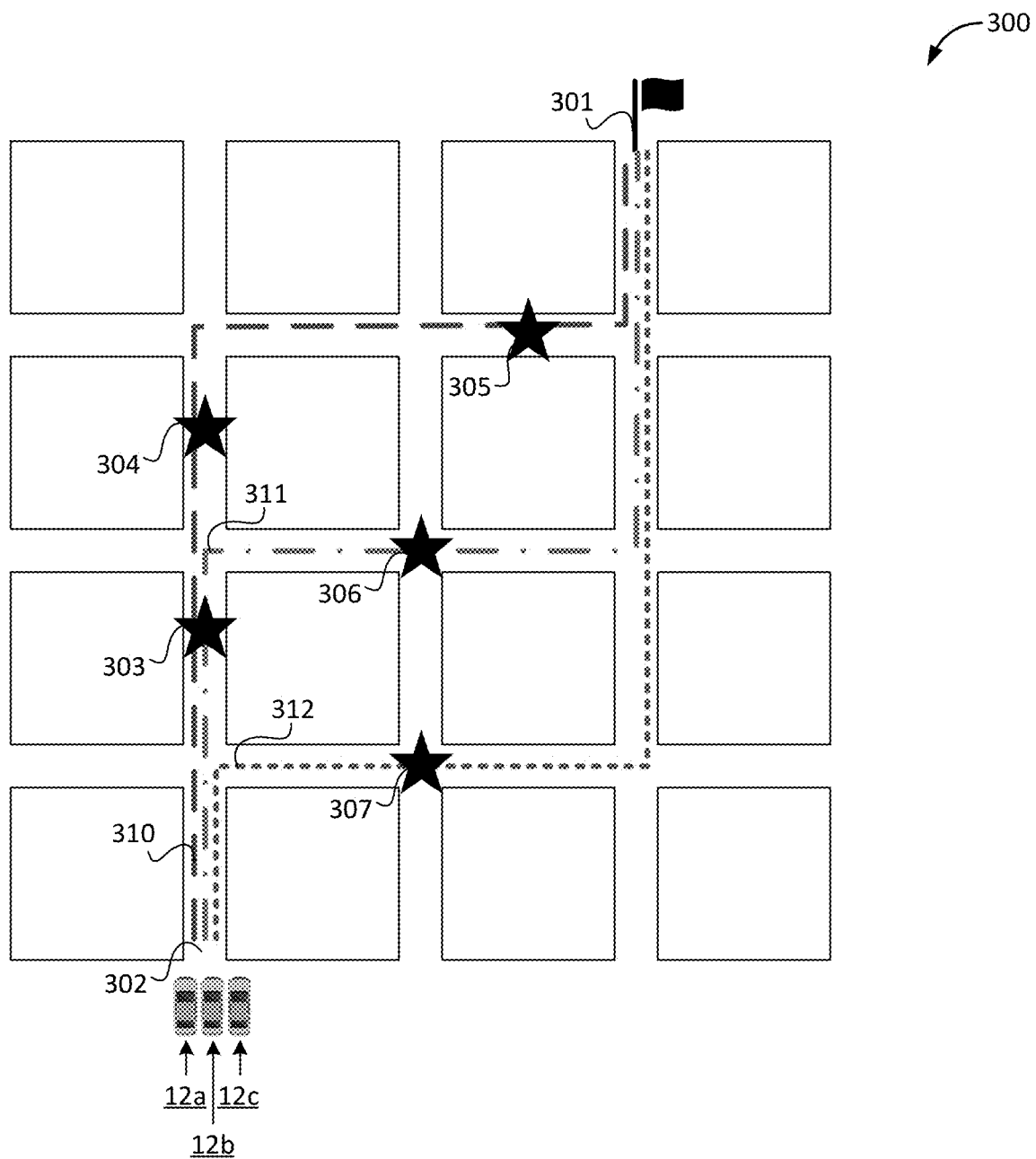
FIG. 3 illustrates a risk profile as may be used by a system configured for using risk profiles for fleet management of a fleet of vehicles, in accordance with one or more implementations.

By way of non-limiting example, FIG. 3 illustrates a map 300 depicting a geographical area around vehicles 12a-12b-12c and various routes. For example, map 300 may include a target destination 301 for vehicles 12a-12b-12c. For example, map 300 may include a point of origin 302 for vehicles 12a-12b-12c. For example, point of origin 302 may be the current location of vehicles 12a-12b-12c. Vehicle 12a may intend to traverse a first route 310, vehicle 12b may intend to traverse a second route 311, and vehicle 12c may intend to traverse a third route 312 to target destination 301. Identifiers 303, 304, 305, 306, and 307 may represent previously detected vehicle events, also referred to as event 303, event 304, event 305, event 306, and event 307, respectively. In one example, first route 310 may be more prone to the occurrence of vehicle events (compared to second route 311 and third route 312) based on previously detected vehicle events. A performance determination component similar to performance determination component 112 in FIG. 1 may determine a first performance level for the vehicle operator of vehicle 12a upon completion of first route 310, a second performance level for the vehicle operator of vehicle 12b upon completion of second route 311, and a third performance level for the vehicle operator of vehicle 12c upon completion if third route 312. In a case where none of vehicles 12a-12b-12c have any vehicle events, the first performance level may be higher than the second or third performance level. In some implementations, the system as disclosed may determine and/or estimate how many occurrences of a particular type of vehicle event are expected along each route (which may be a fraction). For example, 0.02 vehicle events may be expected along first route 310, 0.01 vehicle events may be expected along second route 311, and 0.05 vehicle events may be expected along third route 312. In such a case, if none of vehicles 12a-12b-12c have any vehicle events, the third performance level may be higher than the first or second performance level, based on expectations.

Referring to FIG. 1, performance comparison component 114 may be configured to compare performance levels, metrics that quantify performance levels, and/or other information related to performances by vehicle operators. In some implementations, the one or more metrics for a particular vehicle operator may be compared with aggregated metrics that quantify performance levels of a set of vehicle operators. In some implementations, aggregated metrics may be determined for multiple vehicle operators in a particular company, in a particular geographical area, in a particular age or experience range, and/or based on any distinguishing characteristic(s) of a vehicle operator.

Result component 116 may be configured to store, transfer, and/or present results of the determination, estimation, comparison, analysis, and/or otherwise processing of performance levels. For example, a fleet manager or other stakeholder may be presented with an overview of the performance levels of the vehicle operators within the fleet for this year, this month, this week, etc.

Metric analysis component 118 may be configured to analyze performance levels, metrics that quantify performance levels, and/or other information related to performances by vehicle operators. In some implementations, metric analysis component 118 may be configured to analyze the one or more metrics that quantify a performance level for a particular vehicle operator. In some implementations, metric analysis component 118 may be configured to determine, based on analysis, which particular vehicle event, particular vehicle event type, and/or particular driving scenario contributes disproportionately to a particular performance level for a particular vehicle operator. For example, in some implementations, the particular vehicle event that contributes disproportionately may be the particular vehicle event that, had it not occurred, would have improved the particular performance level by the greatest amount. In some implementations, the particular vehicle event that contributes disproportionately may be the particular vehicle event that contributes most to a difference between the one or more metrics for the particular vehicle operator and the aggregated metrics that quantify performance levels of a set of vehicle operators.

In some implementations, system 100 may be configured to select a route from a set of routes for a particular vehicle operator based on analysis by metric analysis component 118. For example, a first route may be less suitable than a second route based on the performance level of the particular vehicle operator in view of the type of vehicle event that contributed disproportionately to the particular performance level of the particular vehicle operator.

Information presentment component 120 may be configured to present, via a user interface, information regarding the analysis by metric analysis component 118. For example, information presentment component 120 may present specifics regarding a driving scenario that contributed disproportionately to a worse-than-average level of performance. In some implementations, the presented information may reflect advice on improving a level of performance, and, in particular, for improving the one or more metrics that quantify a performance level of the particular vehicle operator.

Team component 122 may be configured to determine a combined value representing a likelihood of occurrences of vehicles events involving a team of vehicle operators cooperatively operating the same vehicle. In some implementations, the team may include a first vehicle operator and a second vehicle operator. In some implementations, the first operator may be a human vehicle operator and the second operator may be an autonomous driving algorithm. In some implementations, the combined value may be based on estimated expected occurrences (e.g., by performance determination component 112).

Recommendation presentment component 124 may be configured to present, via a user interface, a recommendation regarding suitability of the team for cooperative operation of the same vehicle. By way of non-limiting example, cooperative driving may include a first driver acting as the primary operator, and a second driver acting as the back-up operator that can take over driving responsibilities from the primary operator. The recommendation may be based on the combined value, e.g., as determined by team component 122. In some implementations, a recommendation may be route-specific, and/or otherwise based on the expected driving scenarios along a particular route. For example, if a human driver and an autonomous driving algorithm are both below-average for the specific types of vehicle events and/or driving scenarios that are expected along a particular route, the recommendation may be negative. Alternatively, a recommendation may be to change the particular route to a particular destination. In some implementations, a recommendation may be to combine different operators together as a team for a specific target route.

Driver switching component 126 may be configured to determine when a second driver should take over driving responsibilities from a first driver. By way of non-limiting example, cooperative driving may include a first driver acting as the primary operator, and a second driver acting as the back-up operator that can take over driving responsibilities from the primary operator. In some implementations, determinations by driving switching component 126 may be based on different types of information, including but not limited to values representing expectations of particular types of vehicle event occurring, for example of a particular route. In some implementations, driver switching component 126 may be configured to determine when a second driver should take over driving responsibilities from a first driver, the determination being based on a first value representing a first expectation of a particular type of vehicle event occurring if the first driver continues driving a current route, in comparison to a second value representing a second expectation of the particular type of vehicle event occurring if the second driver drives the current route. In some implementations, the previously detected vehicle events may have been detected by the fleet of vehicles. In some implementations, the first driver may be a human and the second driver is an autonomous driving algorithm.

In some implementations, server(s) 102, client computing platform(s) 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, and/or 126, and/or other components. Processor(s) 132 may be configured to execute components 108, 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, and/or 126 are illustrated in FIG. 1 as being implemented within a single processing unit, in implementations in which processor(s) 132 includes multiple processing units, one or more of components 108, 110, 112, 114, 116, 118, 120, 122, 124, and/or 126 may be implemented remotely from the other components. The description of the functionality provided by the different components 108, 110, 112, 114, 116, 118, 120, 122, 124, and/or 126 described below is for illustrative purposes, and is not intended to be limiting, as any of components 108, 110, 112, 114, 116, 118, 120, 122, 124, and/or 126 may provide more or less functionality than is described. For example, one or more of components 108, 110, 112, 114, 116, 118, 120, 122, 124, and/or 126 may be eliminated, and some or all of its functionality may be provided by other ones of components 108, 110, 112, 114, 116, 118, 120, 122, 124, and/or 126. As another example, processor(s) 132 may be configured to execute one or more additional components that may perform some or all of the functionality attributed below to one of components 108, 110, 112, 114, 116, 118, 120, 122, 124, and/or 126.

Figure 2:
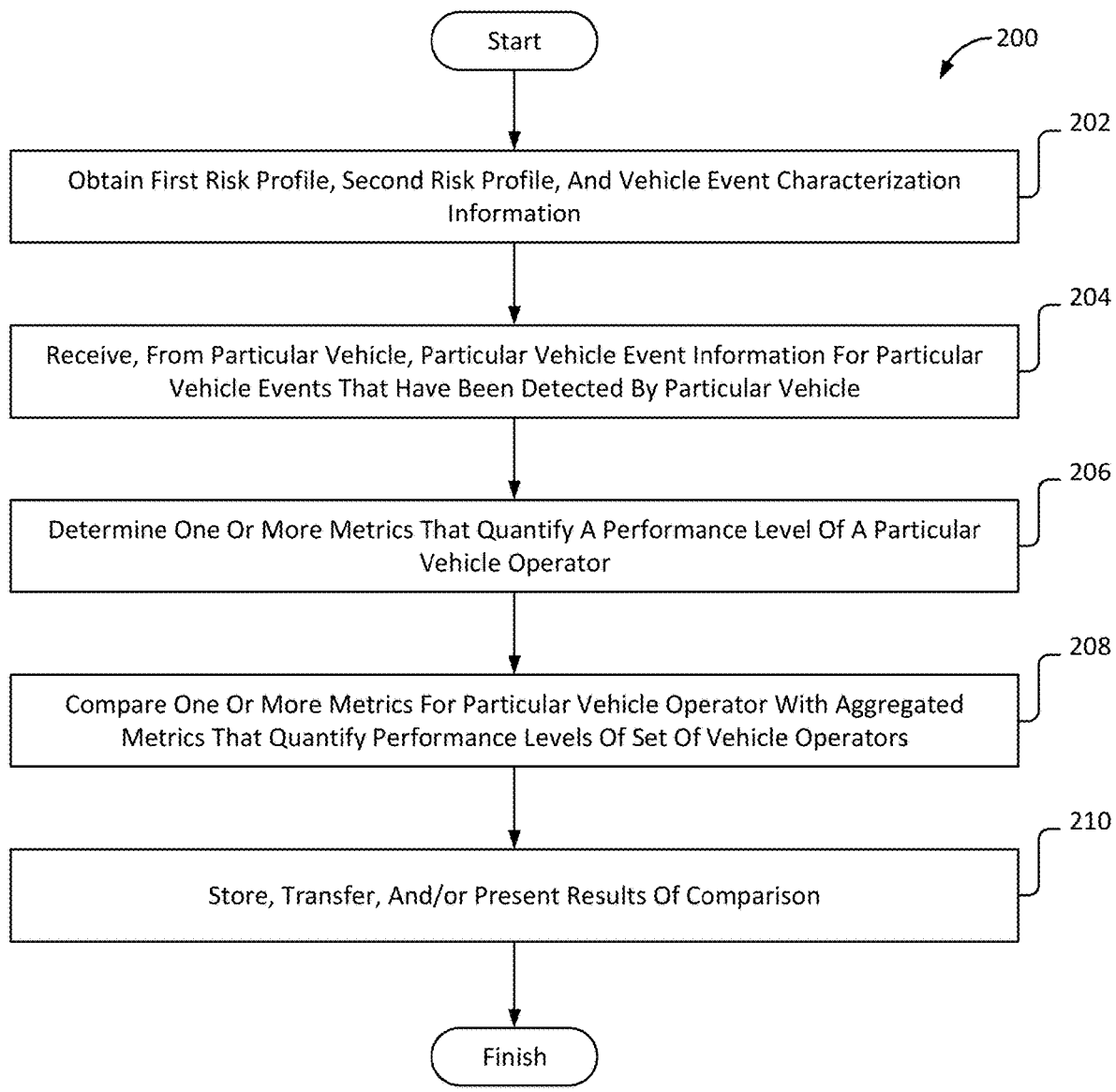
FIG. 2 includes a flow chart of a method for using risk profiles for fleet management of a fleet of vehicles, in accordance with one or more implementations.

FIG. 2 illustrates a method 200 for using risk profiles for fleet management of a fleet of vehicles, in accordance with one or more implementations. The risk profiles may characterize values representing likelihoods of occurrences of vehicle events. The values may be based on vehicle event information for previously detected vehicle events. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining a first risk profile, a second risk profile, and vehicle event characterization information. The first risk profile may be specific to a certain context for detecting vehicle events. The first risk profile may characterize a first set of values representing likelihoods of occurrences of vehicle events matching the certain context. The second risk profile may be specific to operators. The second risk profile may characterize a second set of values representing likelihoods of occurrences of vehicle events matching the operators. The vehicle event characterization information may characterize one or more types of vehicle events to be used in determining performance levels by vehicle operators. Operation 202 may be performed by one or more hardware processors configured by machine-readable instructions including a component that is the same as or similar to risk profile component 108, in accordance with one or more implementations.

An operation 204 may include receiving, from a particular vehicle, particular vehicle event information for particular vehicle events that have been detected by the particular vehicle. The particular vehicle may have a particular vehicle type and may be operated by a particular vehicle operator. The particular vehicle event information may include particular locations of the particular vehicle events. The particular vehicle event information may further include particular types of the particular vehicle events. Operation 204 may be performed by one or more hardware processors configured by machine-readable instructions including a component that is the same as or similar to vehicle event information component 110, in accordance with one or more implementations.

An operation 206 may include determining one or more metrics that quantify a performance level of the particular vehicle operator. The determination of the one or more metrics may be based on one or more of the received particular vehicle event information, the first risk profile, and the vehicle event characterization information. Operation 206 may be performed by one or more hardware processors configured by machine-readable instructions including a component that is the same as or similar to performance determination component 112, in accordance with one or more implementations.

An operation 208 may include comparing the one or more metrics for the particular vehicle operator with aggregated metrics that quantify performance levels of a set of vehicle operators. Operation 208 may be performed by one or more hardware processors configured by machine-readable instructions including a component that is the same as or similar to performance comparison component 114, in accordance with one or more implementations.

An operation 210 may include storing, transferring, and/or presenting results of the comparison. Operation 210 may be performed by one or more hardware processors configured by machine-readable instructions including a component that is the same as or similar to result component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for recommending route changes to vehicle operators based on risk profiles of a fleet of vehicles that are operated by the vehicle operators, wherein the fleet of vehicles is networked through an electronic communication network, wherein the risk profiles characterize values representing likelihoods of occurrences of vehicle events, the system comprising:

the fleet of vehicles, wherein individual vehicles in the fleet are configured to detect vehicle events, and wherein the individual vehicles in the fleet are further configured to electronically transfer vehicle event information regarding previously detected vehicle events, through the electronic communication network, to the system; and one or more hardware processors configured by machine-readable instructions to:

obtain a first risk profile, a second risk profile, and vehicle event characterization information, wherein the first risk profile is specific to a certain context for detecting the vehicle events, wherein the certain context includes locations where the vehicle events have been detected, wherein the first risk profile characterizes a first set of values representing likelihoods of occurrences of vehicle events matching the certain context, wherein the second risk profile is specific to a set of vehicle operators, wherein the second risk profile characterizes a second set of values representing likelihoods of occurrences of vehicle events involving the set of vehicle operators, wherein the vehicle event characterization information characterizes one or more types of vehicle events to be used in determining performance levels by particular vehicle operators, and wherein the first set of values and the second set of values are based on the vehicle event information for the previously detected vehicle events;

receive, from a particular vehicle through the electronic communication network, particular vehicle event information for particular vehicle events that have been detected by the particular vehicle, wherein the particular vehicle event information includes information representing routes traversed by the particular vehicle, wherein the particular vehicle has a particular vehicle type and is operated by a particular vehicle operator, wherein the particular vehicle event information includes particular locations of the particular vehicle events, and wherein the particular vehicle event information further includes particular types of the particular vehicle events;

estimate, based on at least the second risk profile, expected occurrences of expected vehicle events during traversal of a particular route by the particular vehicle;

determine aggregated metrics that quantify performance levels of the set of vehicle operators, wherein determination is based on the estimated expected occurrences of the expected vehicle events;

determine one or more metrics that quantify a performance level of the particular vehicle operator for the traversal of the particular route by the particular vehicle, wherein the determination of the one or more metrics is based at least in part on the received particular vehicle event information;

perform a comparison of the one or more metrics for the particular vehicle operator with the aggregated metrics that quantify the performance levels of the set of vehicle operators;

select a suitable route from a set of routes for the particular vehicle operator based on the comparison, wherein the performance level of the particular vehicle operator for the traversal of the particular route is expected to be outperformed by the particular vehicle operator traversing the suitable route;

determine a recommendation based on the comparison, wherein the recommendation includes changing the particular route of the particular vehicle to the suitable route as selected; and present the recommendation via a user interface to a user of the system, wherein the recommendation includes traversing the suitable route.

2. The system of claim 1, wherein the first set of values and the second set of values are based on the vehicle event information, wherein the previously detected vehicle events have been detected by the fleet of vehicles, wherein the vehicle event information includes the certain context for the previously detected vehicle events and the operators for the previously detected vehicle events.

3. The system of claim 1, wherein the certain context for detecting vehicle events further includes one or more of local weather, heading of one or more vehicles, and/or traffic conditions.

4. The system of claim 1, wherein the certain context for detecting vehicle events further includes one or more of objects on roadways during detection of vehicle events, other incidents within a particular timeframe of detection of vehicle events, time of day, lane information, and/or presence of autonomously operated vehicles within a particular proximity.

5. The system of claim 1, wherein the particular vehicle operator is an autonomous driving algorithm.

6. The system of claim 1, wherein the one or more hardware processors are further configured by machine-readable instructions to:

present, via the user interface, information regarding the driving scenario, wherein the information reflects advice on improving the one or more metrics for the particular vehicle operator.

7. The system of claim 1, wherein the set of vehicle operators include a first operator and a second operator, wherein the first operator is a human and the second operator is an autonomous driving algorithm;

wherein the one or more hardware processors are further configured by machine-readable instructions to determine a combined value representing a likelihood of occurrences of vehicles events involving a team of vehicle operators cooperatively operating the same vehicle, wherein the team includes the first vehicle operator and the second vehicle operator; and wherein the one or more hardware processors are further configured by machine-readable instructions to present, via the user interface, a second recommendation regarding suitability of the team for cooperative operation of the same vehicle, wherein cooperative driving includes a first driver acting as the primary operator, and a second driver acting as the back-up operator that can take over driving responsibilities from the primary operator, and wherein the second recommendation is based on the combined value.

8. The system of claim 7, wherein the one or more hardware processors are further configured by machine-readable instructions to:

determine when the second driver should take over driving responsibilities from the first driver, wherein the determination is based on a first value representing a first expectation of a particular type of vehicle event occurring if the first driver continues driving a current route, as compared to a second value representing a second expectation of the particular type of vehicle event occurring if the second driver drives the current route.

9. A method for recommending route changes to vehicle operators based on risk profiles for of a fleet of vehicles that are operated by the vehicle operators, wherein the fleet of vehicles is networked through an electronic communication network, wherein the risk profiles characterize values representing likelihoods of occurrences of vehicle events, the method comprising:

detecting, by individual vehicles in the fleet of vehicles, vehicle events;

electronically transferring, by the individual vehicles in the fleet of vehicles, through the electronic communication network, vehicle event information regarding previously detected vehicle events;

obtaining a first risk profile, a second risk profile, and vehicle event characterization information, wherein the first risk profile is specific to a certain context for detecting the vehicle events, wherein the certain context includes locations where the vehicle events have been detected, wherein the first risk profile characterizes a first set of values representing likelihoods of occurrences of vehicle events matching the certain context, wherein the second risk profile is specific to a set of vehicle operators, wherein the second risk profile characterizes a second set of values representing likelihoods of occurrences of vehicle events involving the set of vehicle operators, wherein the vehicle event characterization information characterizes one or more types of vehicle events to be used in determining performance levels by particular vehicle operators, and wherein the first set of values and the second set of values are based on the vehicle event information for the previously detected vehicle events;

receiving, from a particular vehicle through the electronic communication network, particular vehicle event information for particular vehicle events that have been detected by the particular vehicle, wherein the particular vehicle event information includes information representing routes traversed by the particular vehicle, wherein the particular vehicle has a particular vehicle type and is operated by a particular vehicle operator, wherein the particular vehicle event information includes particular locations of the particular vehicle events, and wherein the particular vehicle event information further includes particular types of the particular vehicle events;

estimating, based on at least the second risk profile, expected occurrences of expected vehicle events during traversal of a particular route by the particular vehicle;

determining aggregated metrics that quantify performance levels of the set of vehicle operators, wherein determination is based on the estimated expected occurrences of the expected vehicle events;

determining one or more metrics that quantify a performance level of the particular vehicle operator for the traversal of the particular route by the particular vehicle, wherein the determination of the one or more metrics is based at least in part on the received particular vehicle event information;

performing an analysis of the one or more metrics for the particular vehicle operator for a driving scenario that contributes disproportionately to a difference between the one or more metrics for the particular vehicle operator and the aggregated metrics;

performing a comparison of the one or more metrics for the particular vehicle operator with the aggregated metrics that quantify the performance levels of the set of vehicle operators;

selecting a suitable route from a set of routes for the particular vehicle operator based on the analysis and the comparison;

determining a recommendation based on the analysis and the comparison, wherein the recommendation includes changing the particular route of the particular vehicle to the suitable route as selected; and presenting the recommendation via a user interface to a user, wherein the recommendation includes traversing the suitable route.

10. The method of claim 9, wherein the first set of values and the second set of values are based on the vehicle event information, wherein the previously detected vehicle events have been detected by the fleet of vehicles, wherein the vehicle event information includes the certain context for the previously detected vehicle events and the operators for the previously detected vehicle events.

11. The method of claim 9, wherein the certain context for detecting vehicle events further includes one or more of local weather, heading of one or more vehicles, and/or traffic conditions.

12. The method of claim 9, wherein the certain context for detecting vehicle events further includes one or more of objects on roadways during detection of vehicle events, other incidents within a particular timeframe of detection of vehicle events, time of day, lane information, and/or presence of autonomously operated vehicles within a particular proximity.

13. The method of claim 9, wherein the particular vehicle operator is an autonomous driving algorithm.

14. The method of claim 9, further comprising:
presenting, via the user interface, information regarding the driving scenario, wherein the information reflects advice on improving the one or more metrics for the particular vehicle operator.

15. The method of claim 9, wherein the set of vehicle operators include a first operator and a second operator, wherein the first operator is a human and the second operator is an autonomous driving algorithm, the method further comprising:
determining a combined value representing a likelihood of occurrences of vehicles events involving a team of vehicle operators cooperatively operating the same vehicle, wherein the team includes the first vehicle operator and the second vehicle operator; and
presenting, via the user interface, a second recommendation regarding suitability of the team for cooperative operation of the same vehicle, wherein cooperative driving includes a first driver acting as the primary operator, and a second driver acting as the back-up operator that can take over driving responsibilities from the primary operator, and wherein the second recommendation is based on the combined value.

16. The method of claim 15, further comprising:
determining when the second driver should take over driving responsibilities from the first driver, wherein the determination is based on a first value representing a first expectation of a particular type of vehicle event occurring if the first driver continues driving a current route, as compared to a second value representing a second expectation of the particular type of vehicle event occurring if the second driver drives the current route.

17. A system configured for recommending changes in driving responsibilities of a team of a first vehicle operator and a second vehicle operator for cooperative operation of a first vehicle based on risk profiles of a fleet of vehicles that are operated by vehicle operators, wherein the fleet of vehicles is networked through an electronic communication network, wherein the risk profiles characterize values representing likelihoods of occurrences of vehicle events, the system comprising:
the fleet of vehicles, wherein individual vehicles in the fleet are configured to detect vehicle events, and wherein the individual vehicles in the fleet are further configured to electronically transfer vehicle event information regarding previously detected vehicle events, through the electronic communication network, to the system; and
one or more hardware processors configured by machine-readable instructions to:
obtain a first risk profile, a second risk profile, and vehicle event characterization information, wherein the first risk profile is specific to a certain context for detecting the vehicle events, wherein the certain context includes locations where the vehicle events have been detected, wherein the first risk profile characterizes a first set of values representing likelihoods of occurrences of vehicle events matching the certain context, wherein the second risk profile is specific to a set of vehicle operators including the first vehicle operator and the second vehicle operator, wherein the second risk profile characterizes a second set of values representing likelihoods of occurrences of vehicle events involving the set of vehicle operators, wherein the vehicle event characterization information characterizes one or more types of vehicle events to be used in determining performance levels by particular vehicle operators, and wherein the first set of values and the second set of values are based on the vehicle event information for the previously detected vehicle events;

receive, from the first vehicle through the electronic communication network, particular vehicle event information for particular vehicle events that have been detected by the first vehicle, wherein the particular vehicle event information includes information representing routes traversed by the first vehicle, wherein the first vehicle is operated by the team of the first vehicle operator and the second vehicle operator such that the first vehicle operator acts as primary operator and the second vehicle operator acts as back-up operator that can take over the driving responsibilities from the primary operator, wherein the particular vehicle event information includes particular locations of the particular vehicle events, and wherein the particular vehicle event information further includes particular types of the particular vehicle events;

estimate, based on at least the second risk profile, expected occurrences of expected vehicle events during traversal of a particular route by the first vehicle with the first vehicle operator acting as the primary operator and the second vehicle operator acting as the back-up operator that can take over the driving responsibilities from the primary operator;

determine aggregated metrics that quantify performance levels of the set of vehicle operators, wherein determination is based on the estimated expected occurrences of the expected vehicle events;

determine one or more metrics that quantify one or more performance levels of the team for the traversal of the particular route by the first vehicle, wherein the determination of the one or more metrics is based at least in part on the received particular vehicle event information;

perform a comparison of the one or more metrics for the team with the aggregated metrics that quantify the performance levels of the set of vehicle operators;

determine a recommendation that recommends the second vehicle operator taking over the driving responsibilities from the first vehicle operator, wherein the recommendation is based on the comparison; and present the recommendation via a user interface to a user of the system.

* * * * *